United States Patent
Ganti et al.

(10) Patent No.: US 10,832,200 B2
(45) Date of Patent: Nov. 10, 2020

(54) AUTOMATIC DISASTER RECOVERY SOLUTION FOR INCLEMENT WEATHER

(71) Applicant: International Business Machines Corporation, Armonk, NY (US)

(72) Inventors: Veena Ganti, Austin, TX (US); Rui Yang, Austin, TX (US); Lakshmi Yadlapati, Austin, TX (US); Uma Mandava, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 15/656,116

(22) Filed: Jul. 21, 2017

(65) Prior Publication Data

US 2019/0026664 A1    Jan. 24, 2019

(51) Int. Cl.
*G06Q 10/06*  (2012.01)
*G06F 9/455*  (2018.01)
*G06F 3/06*   (2006.01)

(52) U.S. Cl.
CPC ..... *G06Q 10/0635* (2013.01); *G06F 9/45558* (2013.01); *G06F 3/0647* (2013.01); *G06F 9/455* (2013.01); *G06F 2009/4557* (2013.01); *G06F 2009/45575* (2013.01)

(58) Field of Classification Search
CPC ............ G06Q 10/0635; G06F 9/45558; G06F 2009/4557; G06F 2009/45575; G06F 9/455; G06F 3/0647
USPC ...................................................... 705/7.28
See application file for complete search history.

(56) References Cited

U.S. PATENT DOCUMENTS

| | | | | |
|---|---|---|---|---|
| 7,219,136 | B1 * | 5/2007 | Danner ................. | G06Q 20/16 379/67.1 |
| 8,341,626 | B1 * | 12/2012 | Gardner ............... | G06F 9/4856 718/1 |
| 2009/0031307 | A1 * | 1/2009 | Chodroff ............. | G06F 11/3013 718/100 |
| 2012/0053884 | A1 | 3/2012 | Batzler et al. | |
| 2012/0147030 | A1 * | 6/2012 | Hankers ............... | G09B 29/006 345/619 |
| 2012/0310765 | A1 | 12/2012 | Masters | |
| 2013/0041989 | A1 * | 2/2013 | Boss ...................... | G06F 9/505 709/223 |
| 2013/0325737 | A1 * | 12/2013 | Smalling .............. | G06Q 10/083 705/330 |
| 2013/0332375 | A1 * | 12/2013 | Fackler ................. | G06Q 10/10 705/314 |

(Continued)

OTHER PUBLICATIONS

How to use cloud-based disaster recovery tools to prepare for the worst. Network World: NA. Network World, Inc. (Oct. 30, 2013).*

(Continued)

*Primary Examiner* — Timothy Padot
(74) *Attorney, Agent, or Firm* — Peter J. Edwards

(57) ABSTRACT

A computer sends a first request for weather information to a weather service. The computer receives a first weather information. The computer identifies one or more weather conditions contained within the first weather information. Based on the one or more weather conditions, the computer determines a disaster recovery action is appropriate. The computer implements the disaster recovery action.

11 Claims, 5 Drawing Sheets

(56) References Cited

U.S. PATENT DOCUMENTS

| | | | | |
|---|---|---|---|---|
| 2015/0088586 A1* | 3/2015 | Pavlas | ................ | G06F 9/45558 |
| | | | | 705/7.25 |
| 2015/0099531 A1* | 4/2015 | Steiger | .................. | G06Q 10/20 |
| | | | | 455/456.1 |
| 2015/0121122 A1* | 4/2015 | Towstopiat | ........... | G06F 11/328 |
| | | | | 714/4.11 |
| 2016/0349716 A1* | 12/2016 | Slessman | ............... | G05B 13/02 |
| 2017/0168903 A1* | 6/2017 | Dornemann | ........ | G06F 9/45558 |
| 2017/0336213 A1* | 11/2017 | Fowe | .................. | B60W 30/143 |
| 2018/0081642 A1* | 3/2018 | Alurralde Iturri | ........ | G06F 8/35 |

OTHER PUBLICATIONS

Virtual Compute Corporation Goes Underground to Provide Clients Swift Disaster Recovery in Case of Terrorist Attacks or Natural Disasters in Texas. Business Wire Jul. 1, 2004: NA.*

Mell et al., "The NIST Definition of Cloud Computing", Recommendations of the National Institute of Standards and Technology. Special Publication 800-145, Sep. 2011. 7 pages.

* cited by examiner

AUTOMATIC DISASTER RECOVERY SOLUTION FOR INCLEMENT WEATHER

BACKGROUND

Information Technology (IT) systems have become increasingly important to the smooth operation of an organization. Part of an organization's risk management is ensuring the continued operation of those systems and the rapid recovery of those systems from interruptions and disasters. IT systems use disaster recovery solutions, which encompass both avoidance of a disaster and recovery in the event of a disaster, in an effort to minimize system downtime.

SUMMARY

Disclosed herein are embodiments of a method and computer program product for disaster recovery. A computer sends a first request for weather information to a weather service. The computer receives a first weather information. The computer identifies one or more weather conditions contained within the first weather information. Based on the one or more weather conditions, the computer determines a disaster recovery action is appropriate. The computer implements the disaster recovery action.

Also disclosed herein are embodiments of a system for disaster recovery. The system includes one or more processors and a memory communicatively coupled to the one or more processors, wherein the memory comprises instructions for execution by the one or more processors. The processor(s) send a first request for weather information to a weather service. The processor(s) receive a first weather information. The processor(s) identify one or more weather conditions contained within the first weather information. Based on the one or more weather conditions, the processor(s) determine a disaster recovery action is appropriate. The processor(s) implement the disaster recovery action.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
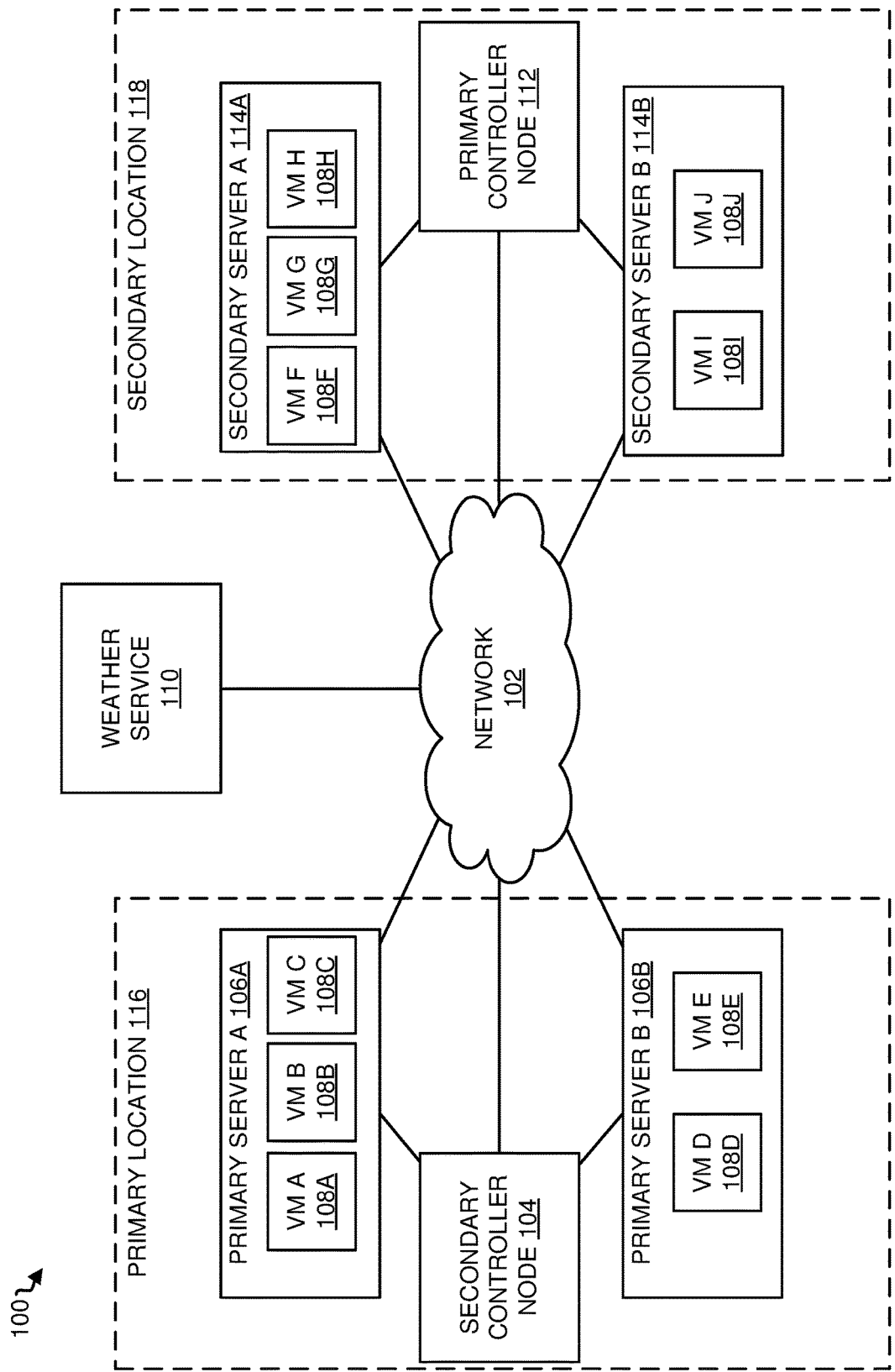
FIG. 1 illustrates a block diagram of an example disaster recovery system in which some embodiments of the present disclosure can be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

FIG. 1 depicts a block diagram of an example disaster recovery system 100 in which some embodiments of the present disclosure can be implemented. Network 102 communicatively couples secondary controller node 104, primary servers A and B (106A-106B), weather service 110, primary controller node 112, and secondary servers A and B (114A-114B) via a physical or wireless connection. Network 102 can be as large as the internet, or can be a smaller network such as a wide area network, metropolitan area network, an intranet for a company or other organization, a combination of multiple connected networks, or any other form of network. In some embodiments, other configurations of these components can be used. A further example embodiment can be where network 102 is an intranet for a company or other organization and weather service 110 connects instead to secondary controller node 104 and primary controller node 112 (collectively "controller nodes") directly or indirectly through a separate network (such as the internet) rather than through network 102 (the intranet in such embodiment).

The controller nodes 104 and 112 can monitor the health of the system and its components, receive notifications, perform moves of virtual machines running at one location to another location, and perform any other operations related to servers (primary servers A and B (106A-106B) and/or secondary servers A and B (114A-114B)) as appropriate. At least one of the controller nodes 112 and 104 should be active at any given time and the active controller node can be located in a location which is geographically separate from the location in which the active servers are located. As depicted in FIG. 1, the primary controller node 112 is located in secondary location 118, while primary servers A and B (106A-106B) are located in primary location 116, indicating that the primary controller node is active when the primary servers are active. This physical separation helps ensure that disaster recovery actions can be performed by the active controller node in the event of a disaster in the location containing the active servers. However, in other embodiments, the primary controller node 112 can be located in the primary location 116 or at a tertiary location (not depicted) separate from locations with servers.

Primary controller node 112 can send requests to weather service 110 for weather information to use in determining whether disaster recovery actions are appropriate or necessary. An example controller node is described in more detail below with respect to FIG. 2. The primary controller node 112 is configured to utilize information received from the weather service 110 to automatically initiate disaster recovery based upon inclement weather. In some embodiments, the primary controller node 112 receives weather alerts from a weather service using a representational state transfer (RESTful) application programming interface (API). While the present disclosure is not necessarily limited to such applications, various aspects of the disclosure can be appreciated through a discussion of various examples using this context. Aspects of the present disclosure can also be used with other types of weather alerts or weather alerts received through different means.

In the context of using a RESTful API in this example embodiment, the primary controller node 112 sends a "get" request to a server (operated by a provider such as a weather service), using an appropriate uniform resource identifier (URI), seeking the information described in the "get" request. For example, the primary controller node 112 can send a request to a weather service using a RESTful API for the current weather conditions in Minneapolis, Minn. In response to the "get" request, the weather service can send a response, which can include the requested information, any information needed to interpret the information, or other information as appropriate. For example, in response to the example request for weather conditions in Minneapolis, Minn., the weather service can send a response that it is sunny and 72 degrees Fahrenheit in Minneapolis. Additionally, the RESTful API can be configured to accommodate more specific requests, including requests for predictions or severe weather alerts (such as a tornado watch or a tornado warning) or to respond with more information to requests. Depending on the limitations of a weather service's RESTful API, the primary controller node 112 can request this information as often as allowed, including continuous requests for the latest weather information.

The example disaster recovery system shown in FIG. 1 enables automatic implementation of the disaster recovery actions in response to weather conditions. In particular, as described above, the primary controller node 112 can analyze the received weather information for indications of severe weather. In response to the analysis of the received weather information, the primary controller node 112 can determine that a disaster recovery action is required, and select the appropriate action if more than one option is available. The primary controller node 112 can automatically implement the disaster recovery action selected. Furthermore, the primary controller node 112 and/or the secondary controller node 104 can continue to monitor the weather situation by sending further "get" requests to a weather service's RESTful API, receive updated weather information, and analyze the weather information. The primary controller node 112 and/or the secondary controller node 104 can determine if the severe weather situation has abated or continue this process until it has. Once the primary controller node 112 and/or the secondary controller node 104 determines it is safe to reverse the disaster recovery action, it can do so.

By automatically implementing the disaster recovery action in response to received weather information, the disaster recovery system of FIG. 1 can decrease or prevent system downtime due to natural disasters by enabling a quick response to developing weather conditions. In particular, most weather monitoring stations can detect or predict natural disasters such as hurricanes, floods, tornadoes, earthquakes, etc. with accuracy, but the amount of time between such prediction and the occurrence of such weather may be small. For example, earthquakes may not be predicted with much advance notice. The disaster recovery system of FIG. 1 is able to quickly respond to developing inclement weather by automatically collecting and responding to the weather information, as described in more detail below.

Primary servers A and B (106A-106B) and secondary servers A and B (114A-114B) contain virtual machines A-J (108A-108J). The fact that two primary servers and two secondary servers are depicted in FIG. 1 is for representative purposes only. One or more servers can be present in primary location 116 and one or more servers can be present in secondary location 118. Additionally, one or more servers can be present in other additional locations (not depicted), which can serve as further backups or options for disaster recovery actions. Secondary servers A and B (114A-114B) can be inactive until a disaster recovery action is performed, at which time they can activate and run instances of the virtual machines that were running on primary servers A and B (106A-106B) before the disaster recovery action. Alternatively, in some embodiments, secondary servers A and B (114A-114B) can be active before disaster recovery and contain backup copies of the virtual machines that are running on primary servers A and B (106A-106B). Additionally, the number of virtual machines and the locations of the virtual machines depicted in FIG. 1 is for representative purposes only. Each server can have one or more virtual machines present.

When a disaster recovery action is implemented, primary controller node 112 can activate secondary servers A and B (114A-114B) in secondary location 118 and deactivate primary servers A and B (106A-106B) in primary location 116. Virtual machines A-E (108A-108E) on primary servers A and B (106A-106B) can be restarted as virtual machines F-J (108F-108J) on the previously inactive secondary servers A and B (114A-114B) once they are activated. Alternatively, in some embodiments using backup copies of virtual machines, primary controller node 112 can dictate that the backup copies of the virtual machines which were present on secondary servers A and B (114A-114B) become the active virtual machines and the previously active virtual machines on primary servers A and B (106A-106B) can become the backup copies. Additionally, primary controller node 112 can activate secondary controller node 104, which can in turn deactivate primary controller node 112. Thus, once a disaster recovery action is implemented, the roles of the devices in primary location 116 and those in secondary location 118 are reversed. Once secondary controller node 104, which has been activated, determines the disaster recovery action can be reversed, this process can be reversed, returning the devices to their original states and functions.

Figure 2:
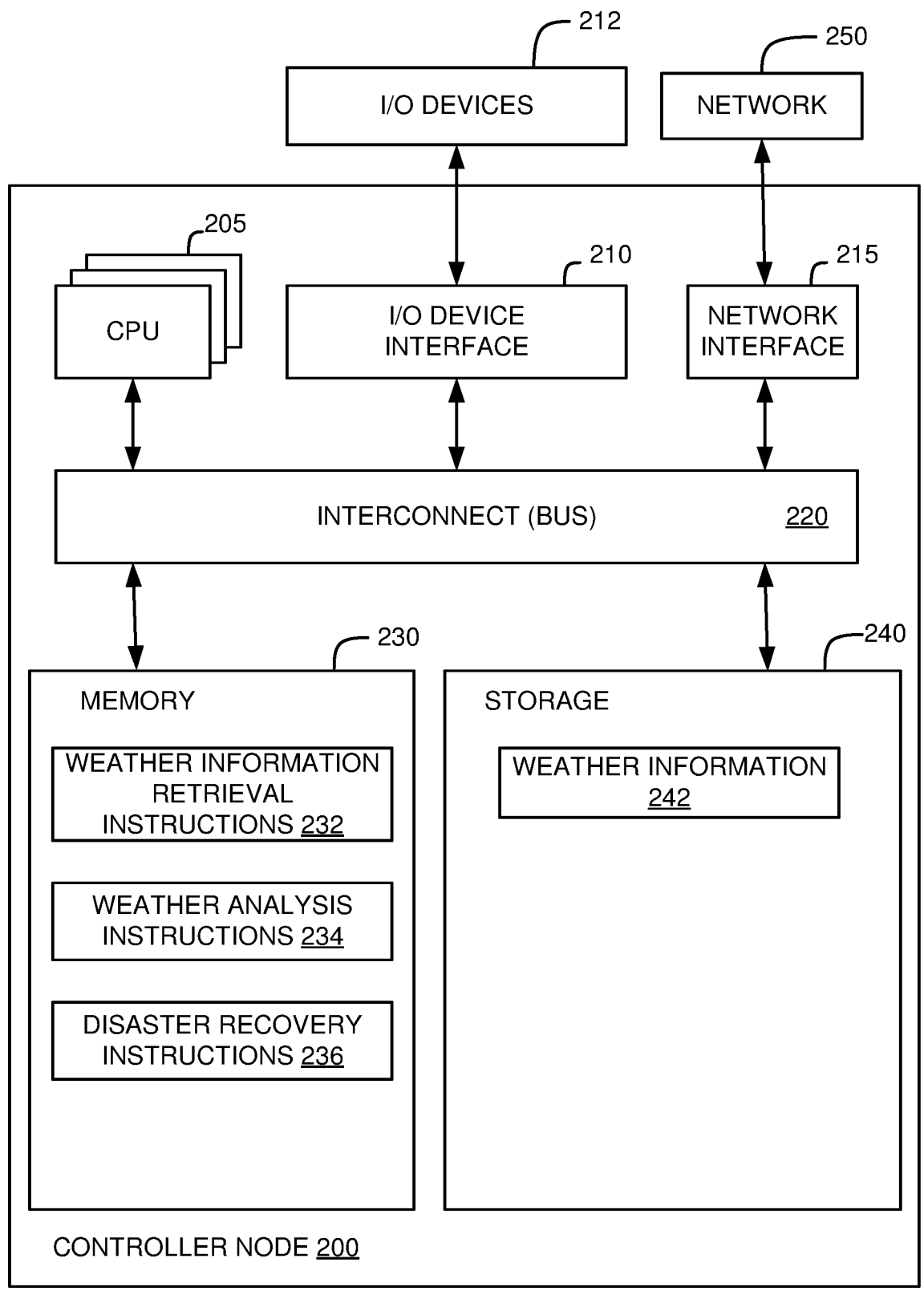
FIG. 2 illustrates a block diagram of an example controller node, in accordance with some embodiments of the present disclosure.

Referring now to FIG. 2, illustrated is a block diagram of an example controller node 200, in accordance with some embodiments of the present disclosure. In some embodiments, controller node 200 performs one or more operations in accordance with FIG. 3 as described below. The controller node 200 can include one or more processors 205 (also referred to herein as CPUs 205), an I/O device interface 210 which can be coupled to one or more I/O devices 212, a network interface 215, an interconnect (e.g., BUS) 220, a memory 230, and a storage 240. One or more components depicted in FIG. 2 can be combined or replaced by a microcontroller. Such microcontroller can, for example, contain one or more CPUs, memory, and programmable input/output peripherals. In embodiments employing a microcontroller, the discussion of the various components of controller node 200 can apply instead to corresponding aspects of the microcontroller when applicable. In some embodiments, controller node 200 can be a virtual machine which uses a portion of one or more CPUs 205, a portion of memory 230, and a portion of storage 240 or otherwise shares resources.

In some embodiments, each CPU 205 can retrieve and execute programming instructions stored in the memory 230 or storage 240. The interconnect 220 can be used to move data, such as programming instructions, between the CPUs 205, I/O device interface 210, network interface 215, memory 230, and storage 240. The interconnect 220 can be implemented using one or more busses. Memory 230 is generally included to be representative of a random access memory (e.g., static random access memory (SRAM), dynamic random access memory (DRAM), or Flash). In some embodiments, the memory 230 can be in the form of modules (e.g., dual in-line memory modules).

The storage 240 is generally included to be representative of a non-volatile memory, such as a hard disk drive, solid state device (SSD), removable memory cards, optical storage, or flash memory devices. In an alternative embodiment, the storage 240 can be replaced by storage area-network (SAN) devices, the cloud, or other devices connected to the controller node 200 via the I/O devices 212 or a network 250 via the network interface 215.

The CPUs 205 can be a single CPU, multiple CPUs, a single CPU having multiple processing cores, or multiple CPUs with one or more of them having multiple processing cores in various embodiments. In some embodiments, a processor 205 can be a digital signal processor (DSP). The CPUs 205 can additionally include one or more memory buffers or caches (not depicted) that provide temporary storage of instructions and data for the CPUs 205. The CPUs 205 can be comprised of one or more circuits configured to perform one or more methods consistent with embodiments of the present disclosure.

The memory 230 of controller node 200 includes weather information retrieval instructions 232, weather analysis instructions 234, and disaster recovery instructions 236. Weather information retrieval instructions 232 can be processor-executable instructions for sending "get" requests to the appropriate URI(s) to access the RESTful API of one or more weather services. Weather information retrieval instructions 232 can also be instructions for creating appropriate "get" requests in the format required by the one or more weather services and requesting the appropriate information controller node 200 will use in determining whether a disaster recovery action is appropriate.

Weather analysis instructions 234 can be processor-executable instructions for analyzing the weather information received from one or more weather services. Weather analysis instructions 234 can vary in embodiments depending on the weather service(s) used and the format of the information used by the weather service(s) to send the weather information. The complexity of weather analysis instructions 234 can also vary in embodiments. In embodiments where the weather service(s) send weather information which includes alerts such as watches and warnings for flash floods, blizzards, tornados, hurricanes, earthquakes, and other natural disasters, weather analysis instructions 234 can analyze the weather information for such a watch or warning. In other embodiments, weather analysis instructions 234 can analyze raw weather data to determine that a particular natural disaster is likely, without an explicit alert or warning from the weather service. In some embodiments, weather analysis instructions 234 can analyze the weather information received from the weather service(s) for weather information for which a controller node should act upon, but may not be termed a natural disaster or the like, such as a temperature change or precipitation. In such embodiments, weather analysis instructions 234 can analyze example weather information indicating that there will be high temperatures in the primary location and may prompt the controller node to initiate disaster recovery actions to activate servers and virtual machines in a secondary location where the temperature will be lower, thus reducing cooling costs. Weather analysis instructions 234 can analyze weather information for a primary location, a secondary location, and any other locations as appropriate.

Disaster recovery instructions 236 can be processor-executable instructions for implementing disaster recovery actions. The form of disaster recovery instructions 236 can vary in embodiments. In embodiments where servers and virtual machines are inactive at a secondary location, disaster recovery instructions 236 will contain instructions for activating the servers and virtual machines at the secondary location and deactivating the servers and virtual machines at the primary location. In embodiments where servers and virtual machines are active at a secondary location as backup copies, disaster recovery instructions 236 will contain instructions for dictating that the backup copies of the virtual machines present on secondary servers become the active virtual machines and the previously active virtual machines on the primary servers become the backup copies. Disaster recovery instructions 236 can be instructions for performing other types of disaster recovery actions in other embodiments. Disaster recovery instructions 236 can also include instructions for selecting an appropriate disaster recovery action where more than one action is possible. For example, in embodiments where there is more than one secondary location (e.g. a tertiary location, a quaternary location), disaster recovery instructions 236 can include instructions for determining which location to use in the disaster recovery action. In such an example, disaster recovery instructions 236 can include instructions to further retrieve weather information and analyze weather information for each of the secondary, tertiary, and quaternary locations (or however many locations are potential locations for disaster recovery actions), determine the location with the lowest chance of severe weather, and select a disaster recovery action using that location. Additionally, determination of the appropriate disaster recovery action can include analysis of factors beyond weather, including cost, availability, performance, or any other relevant consideration.

Storage 240 contains weather information 242. Weather information 242 can be the information received using weather information retrieval instructions 232 and from one or more weather services. A non-exhaustive list of possible examples of weather information includes temperature data, humidity data, pressure data, radiation data, other atmospheric data, severe weather alerts, watches, or warnings, Doppler radar information, historical weather data, predicted future weather data, or any other data received or analyzed. The form of weather information 242 can vary in embodiments. A weather service can send weather information in a common format, such as Extensible Markup Language (XML), or in a proprietary format. Controller node 200 can store weather information 242 in the form received from one or more weather services, can store weather information 242 after analysis, or both.

In some embodiments as discussed above, the memory 230 stores weather information retrieval instructions 232, weather analysis instructions 234, and disaster recovery instructions 236, and the storage 240 stores weather information 242. However, in various embodiments, each of the weather information retrieval instructions 232, weather analysis instructions 234, disaster recovery instructions 236, and weather information 242 are stored partially in memory 230 and partially in storage 240, or they are stored entirely in memory 230 or entirely in storage 240, or they are accessed over a network 250 via the network interface 215.

In various embodiments, the I/O devices 212 can include an interface capable of presenting information and receiving input. For example, I/O devices 212 can receive input from a user and present information to a user and/or a device interacting with controller node 200.

In some embodiments, the network 250 is consistent with network 102 as described with respect to FIG. 1. The network 250 can connect (via a physical or wireless connection) the controller node 200 with one or more devices (e.g., another controller node (104 or 112), primary servers A and B (106A-106B), secondary servers A and B (114A-114B), weather service 110 of FIG. 1) that interact with the controller node.

Logic modules throughout the controller node 200—including but not limited to the memory 230, the CPUs 205, and the I/O device interface 210—can communicate failures and changes to one or more components to a hypervisor or operating system (not depicted). The hypervisor or the operating system can allocate the various resources available in the controller node 200 and track the location of data in memory 230 and of processes assigned to various CPUs 205. In embodiments that combine or rearrange elements, aspects and capabilities of the logic modules can be combined or redistributed. These variations would be apparent to one skilled in the art.

Figure 3:
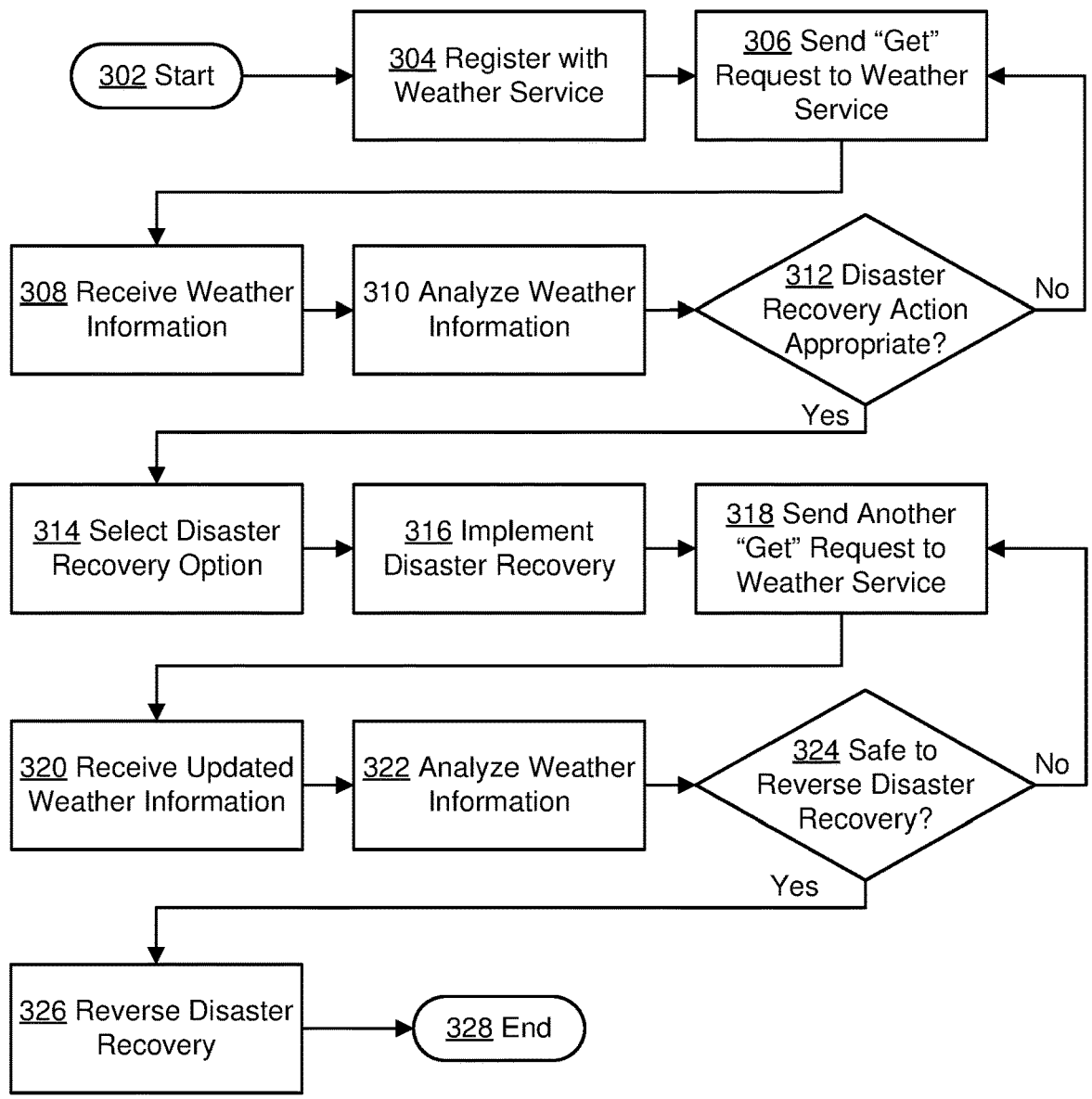
FIG. 3 depicts an example method for automatic disaster recovery using weather information, in accordance with embodiments of the present disclosure.

Referring now to FIG. 3, depicted is an example method 300 automatic disaster recovery using weather information, in accordance with embodiments of the present disclosure. Method 300 can include more or less operations than those depicted. Method 300 can include operations in different orders than those depicted.

From start 302, the disaster recovery system registers with one or more weather services at 304. This operation may not be required in all embodiments. In some embodiments, a weather service may not require registration to access their service, may provide their service free of charge, or may allow for use before registration with billing to occur afterwards. In other embodiments, a disaster recovery system or person operating a disaster recovery system may need to register with a weather service in order to access weather information from the weather service via its RESTful API. The format of such registration or information required to register will vary in embodiments, but may include providing a name of a person, company, or organization and a payment method.

At 306, the disaster recovery system sends a "get" request or requests to one or more weather services. One or more controller nodes of the disaster recovery system can perform this operation. The disaster recovery system can send "get" requests to the appropriate URI(s) to access one or more weather services' RESTful API. These "get" requests can be created in the format required by the one or more weather services and can request the appropriate information the disaster recovery system will use in determining whether a disaster recovery action is appropriate.

At 308, the disaster recovery system receives weather information from one or more weather services. A non-exhaustive list of possible examples of weather information includes temperature data, humidity data, pressure data, radiation data, other atmospheric data, severe weather alerts, watches, or warnings, Doppler radar information, historical weather data, predicted future weather data, or any other data received or analyzed. The form of weather information received can vary in embodiments. A weather service can send weather information in a common format, such as XML, or in a proprietary format.

At 310, the disaster recovery system analyzes the weather information received from one or more weather services. This analysis can vary in embodiments depending on the weather service(s) used and the format of the information used by the weather service(s) to send the weather information. This analysis can include identifying a weather condition contained within the weather information. In embodiments where the weather service(s) send weather information which includes alerts such as watches and warnings for flash floods, blizzards, tornados, hurricanes, earthquakes, and other natural disasters, the disaster recovery system can analyze the weather information for such a watch or warning. In other embodiments, the disaster recovery system can analyze raw weather data to determine that a particular natural disaster is likely, without an explicit alert or warning from the weather service. In some embodiments, the disaster recovery system can analyze the weather information received from the weather service(s) for weather information for which the disaster recovery system should act upon, but may not be termed a natural disaster or the like, such as a temperature change or precipitation. For example, in some such embodiments, the disaster recovery system can analyze example weather information indicating that there will be high temperatures in the primary location and may prompt the disaster recovery system to initiate disaster recovery actions to activate servers and virtual machines in a secondary location where the temperature will be lower, thus reducing cooling costs. The disaster recovery system can analyze weather information for a primary location, a secondary location, and any other locations as appropriate.

At 312, the disaster recovery system determines whether a disaster recovery action is appropriate. The disaster recovery system can use the weather information received in operation 308 and the analysis of that weather information performed in operation 310 in making this determination. Such determination can also include a balancing analysis of cost associated with implementing a disaster recovery action, the likelihood of a disaster, and the potential costs associated with such a disaster. The costs associated with implementing a disaster recovery action and/or the potential costs associated with a disaster can include monetary costs relating to processing or service costs, hardware usage costs, data recovery costs, opportunity costs, or any other applicable form of cost. In some embodiments, the determination whether a disaster recovery action is appropriate can be based upon a determination that the likelihood of a disaster or inclement weather reaches or exceeds an acceptable risk threshold. If the disaster recovery system determines a disaster recovery action is not appropriate, method 300 returns to operation 306 to send another "get" request to one or more weather services to continue to monitor the weather. A disaster recovery system can delay returning to operation 306 for a period of time, such as to request new weather information hourly, every ten minutes, every minute, or on the basis of any other time period.

If the disaster recovery system determines at 312 that a disaster recovery action is appropriate, method 300 continues to 314, and the disaster recovery system selects a disaster recovery option. This operation may not be required in all embodiments, particularly where only one disaster recovery option exists. As an example selection of disaster recovery options, in embodiments where there is more than one secondary location (e.g. a tertiary location, a quaternary location), the disaster recovery system can select which location to use in the disaster recovery action. A disaster recovery system can also include disaster recovery options of moving less than all of the contents of a server or less than all of the virtual machines running on a server to a secondary or backup location. For example, a disaster recovery option may include moving critical virtual machines, functions, or information to a secondary site and not moving less important or lower priority virtual machines, functions, or information. Virtual machines, functions, or information can be identified as critical or have assigned priorities at various times and in various ways in embodiments. For example, critical virtual machines can be so identified when the virtual machines are instantiated. In some embodiments, priority values of virtual machines can vary dynamically depending on the process(es) running on the virtual machines, the clients using the virtual machines, or any other relevant factor or combination of factors. Selection of such a disaster recovery option moving only some virtual machines, functions, or information can occur when the risk of a disaster or inclement weather reaches or exceeds a first risk threshold, but does not reach or exceed a second risk threshold. In some embodiments, a plurality of risk thresholds can be used and functions, virtual machines, or information of varying degrees of importance or priority can be moved to a secondary site based upon the calculated risk of a disaster or inclement weather. Selection of a disaster recovery option may depend on the type or severity of the weather conditions in the received and analyzed weather information.

At 316, the disaster recovery system implements the selected disaster recovery action automatically. The form of this implementation can vary in embodiments depending on the selected disaster recovery action. In embodiments where servers and virtual machines are inactive at a secondary location, the disaster recovery system can activate the servers and virtual machines at the secondary location and deactivate the servers and virtual machines at the primary location. In embodiments where servers and virtual machines are active at a secondary location as backup copies, the disaster recovery system can dictate that the backup copies of the virtual machines present on secondary servers become the active virtual machines and the previously active virtual machines on the primary servers become the backup copies.

At 318, the disaster recovery system sends another "get" request or requests to one or more weather services. Operation 318 proceeds in a similar fashion as operation 306. One or more controller nodes of the disaster recovery system can perform this operation. The disaster recovery system can send "get" requests to the appropriate URI(s) to access one or more weather services' RESTful API. These "get" requests can be created in the format required by the one or more weather services and can request the appropriate information the disaster recovery system will use in determining whether a disaster recovery action is appropriate.

At 320, the disaster recovery system receives weather information from one or more weather services. This weather information can be updated weather information compared to the information received at operation 308, or if an insufficient amount of time has elapsed for the weather service(s) to update the information, it may be the same information presented again. A non-exhaustive list of possible examples of weather information includes temperature data, humidity data, pressure data, radiation data, other atmospheric data, severe weather alerts, watches, or warnings, Doppler radar information, historical weather data, predicted future weather data, or any other data received or analyzed. The form of weather information received can vary in embodiments. A weather service can send weather information in a common format, such as XML, or in a proprietary format.

At 322, the disaster recovery system analyzes the weather information received from one or more weather services in a similar fashion as in operation 310. The analysis performed by disaster recovery system can also include comparison of the weather information received during operation 320 with the information received at operation 308. The analysis can vary in embodiments depending on the weather service(s) used and the format of the information used by the weather service(s) to send the weather information. In embodiments where the weather service(s) send weather information which includes alerts such as watches and warnings for flash floods, blizzards, tornados, hurricanes, earthquakes, and other natural disasters, the disaster recovery system can analyze the weather information for such a watch or warning. In other embodiments, the disaster recovery system can analyze raw weather data to determine that a particular natural disaster is likely or has subsided, without an explicit alert or warning from the weather service. In some embodiments, the disaster recovery system can analyze the weather information received from the weather service(s) for other weather information for which the disaster recovery system can act upon, but may not be termed a natural disaster or the like, such as a temperature change or precipitation. For example, in such embodiments, the disaster recovery system can analyze example weather information indicating previously existing high temperatures in the primary location have subsided and may prompt the disaster recovery system to reverse an implemented disaster recovery action of activating servers and virtual machines in a secondary location where the temperature was lower. The disaster recovery system can analyze weather information for a primary location, a secondary location, and any other locations as appropriate.

At 324, the disaster recovery system determines whether it is safe to reverse the disaster recovery action. This determination can include a determination of whether the severe weather or other condition which prompted implementation of a disaster recovery action has abated. This determination can be based upon the analysis of the weather information at operation 322. Such determination can also include analysis of the likelihood that the severe weather or other condition will continue or resume, and the potential costs associated with reversing the disaster recovery action too early. In some embodiments, the determination of whether it is safe to reverse a disaster recovery action can be based upon a determination that the likelihood of a disaster or inclement weather no longer reaches or exceeds an acceptable risk threshold. If the disaster recovery system determines it is not safe to reverse a disaster recovery action, method 300 returns to operation 318 to send another "get" request to one or more weather services to continue to monitor the weather. A disaster recovery system can delay returning to operation 318 for a period of time, such as to request new weather information hourly, every ten minutes, every minute, or on the basis of any other time period.

At 326, the disaster recovery system reverses the disaster recovery action. The form of this reversal can vary in embodiments depending on the performed disaster recovery action and may proceed in the reverse order of the implementation. In embodiments where servers and virtual machines were activated at a secondary location and deactivated at a primary location, the disaster recovery system can reactivate the servers and virtual machines at the primary location and deactivate the servers and virtual machines at the secondary location. In embodiments where servers and virtual machines were converted from backup copies at a secondary location to active servers and virtual machines, the disaster recovery system can dictate that the backup copies of the virtual machines present on primary servers resume being the active virtual machines and active virtual machines on the secondary servers resume being the backup copies. After reversing the disaster recovery action at 326, method 300 ends at 328.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
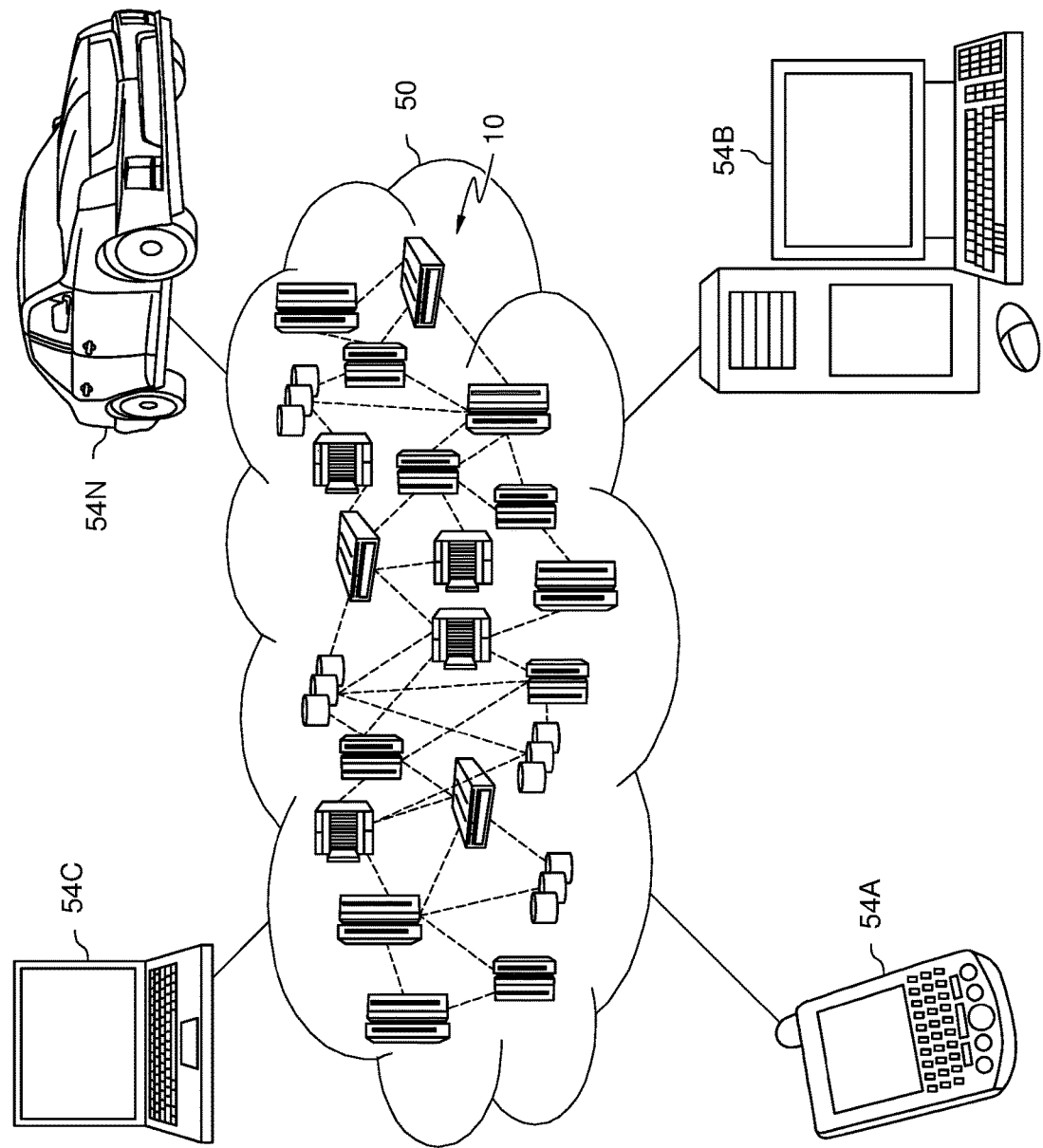
FIG. 4 depicts a cloud computing environment according to an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
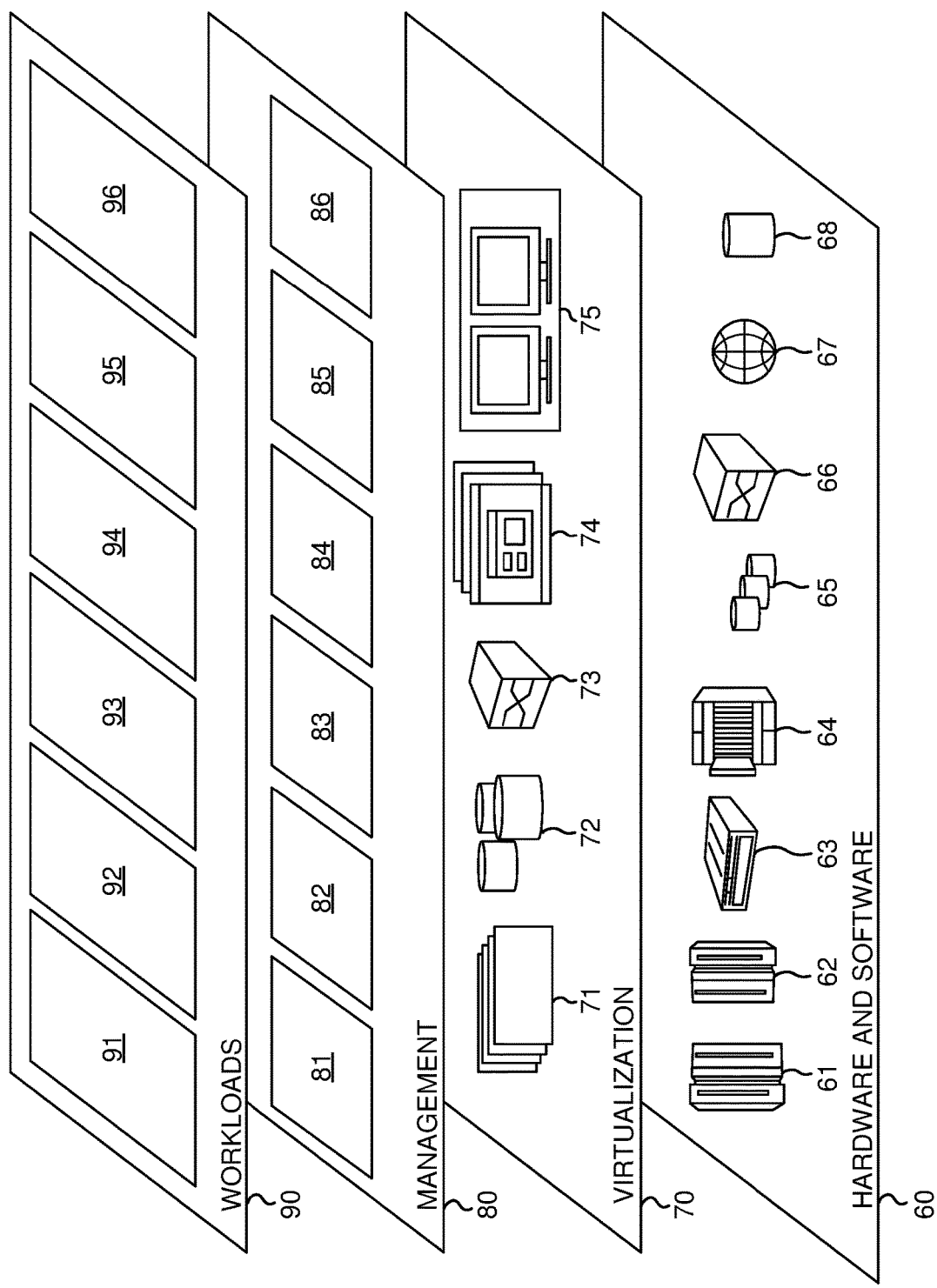
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Controller node 86 can monitor the health of the systems, receive notifications, and perform moves of virtual machines running at one site to another site. Controller node 86 can have the components described above with regard to in FIG. 2 and can perform some or all of the functions described above with regard to FIG. 3.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for disaster recovery, the method comprising:
    sending, by a server controller node, which controls a first plurality of servers and a second plurality of servers, a first request for weather information to a weather service using a representational state transfer (RESTful) application programming interface (API) of the weather service;
    receiving, by the server controller node, a first weather information via the RESTful API, wherein the first weather information is raw weather data;
    identifying, by the server controller node, one or more weather conditions contained within the first weather information by analyzing the raw weather data to determine that a natural disaster is likely, and wherein the one or more weather conditions comprises the natural disaster;
    determining, by the server controller node and based on the one or more weather conditions, a disaster recovery action is appropriate for the first plurality of servers;
    implementing, automatically by the server controller node, the disaster recovery action on the first plurality of servers and second plurality of servers; and
    determining, by the server controller node, a likelihood that the one or more weather conditions will occur exceeds a first risk threshold and does not exceed a second risk threshold, wherein:
        implementing the disaster recovery action comprises deactivating a subset of one or more virtual machines running at a primary location and restarting the subset of one or more virtual machines at a secondary location; and
        the subset of one or more virtual machines comprises one or more prioritized virtual machines of the first plurality of servers having a higher priority than one or more non-prioritized virtual machines of the first plurality of servers.

2. The method of claim 1, the method further comprising:
    sending, by the server controller node, a second request for weather information to the weather service;
    receiving, by the server controller node, a second weather information;
    determining, by the server controller node and based on the second weather information, the one or more weather conditions has abated; and
    reversing, by the server controller node, the disaster recovery action.

3. The method of claim 1, wherein the first request for weather information to a weather service is a "get" request to the weather service's representational state transfer application programming interface.

4. The method of claim 1, the method further comprising:
    selecting, by the server controller node and based on the first weather information, the disaster recovery action, wherein selecting the disaster recovery action includes determining a location for the disaster recovery action with a lowest chance of severe weather.

5. The method of claim 1, the method further comprising:
    evaluating, by the server controller node and based on the first weather information, a likelihood that the one or more weather conditions will occur.

6. A computer program product for disaster recovery, the computer program product comprising a computer readable storage medium having program instructions embodied therewith, wherein the computer readable storage medium is not a transitory signal per se, the program instructions executable by a computer to perform a method comprising the steps of:
    sending, by a server controller node, which controls a first plurality of servers and a second plurality of servers, a first request for weather information to a weather service;
    receiving, by the server controller node, a first weather information, wherein the first weather information is raw weather data;
    identifying, by the server controller node, one or more weather conditions contained within the first weather information by analyzing the raw weather data to determine that a natural disaster is likely, and wherein the one or more weather conditions comprises the natural disaster;
    determining, by the server controller node and based on the one or more weather conditions, a disaster recovery action is appropriate for the first plurality of servers;

implementing, automatically by the server controller node, the disaster recovery action on the first plurality of servers and second plurality of servers; and determining, by the server controller node, a likelihood that the one or more weather conditions will occur exceeds a first risk threshold and does not exceed a second risk threshold, wherein:

implementing the disaster recovery action comprises deactivating a subset of one or more virtual machines running at a primary location and restarting the subset of one or more virtual machines at a secondary location; and the subset of one or more virtual machines comprises one or more prioritized virtual machines of the first plurality of servers having a higher priority than one or more non-prioritized virtual machines of the first plurality of servers.

7. The computer program product of claim 6, the method further comprising:

sending, by the server controller node, a second request for weather information to the weather service;

receiving, by the server controller node, a second weather information;

determining, by the server controller node and based on the second weather information, the one or more weather conditions has abated; and reversing, by the server controller node, the disaster recovery action.

8. The computer program product of claim 6, wherein the first request for weather information to a weather service is a "get" request to the weather service's representational state transfer application programming interface.

9. A system for disaster recovery, the system comprising:

a first plurality of servers and a second plurality of servers;

one or more processors; and a memory communicatively coupled to the one or more processors, wherein the memory comprises instructions which, when executed by the one or more processors, cause the one or more processors to perform a method comprising the steps of:

sending a first request for weather information to a weather service;

receiving a first weather information, wherein the first weather information is raw weather data;

identifying one or more weather conditions contained within the first weather information by analyzing the raw weather data to determine that a natural disaster is likely, and wherein the one or more weather conditions comprises the natural disaster;

determining, based on the one or more weather conditions, a disaster recovery action is appropriate;

implementing, automatically, the disaster recovery action on the first plurality of servers and second plurality of servers; and determining a likelihood that the one or more weather conditions will occur exceeds a first risk threshold and does not exceed a second risk threshold, wherein:

implementing the disaster recovery action comprises deactivating a subset of one or more virtual machines running at a primary location and restarting the subset of one or more virtual machines at a secondary location; and the subset of one or more virtual machines comprises one or more prioritized virtual machines of the first plurality of servers having a higher priority than one or more non-prioritized virtual machines of the first plurality of servers.

10. The system of claim 9, the method further comprising:

sending a second request for weather information to the weather service;

receiving a second weather information;

determining, based on the second weather information, the one or more weather conditions has abated; and reversing the disaster recovery action.

11. The system of claim 9, wherein the first request for weather information to a weather service is a "get" request to the weather service's representational state transfer application programming interface.

* * * * *